June 25, 1963 W. P. AYRES ETAL 3,095,546

GYROMAGNETIC ISOLATOR-USING A NON-UNIFORM MAGNETIC BIAS

Filed March 1, 1956 5 Sheets-Sheet 1

INVENTORS
WESLEY P. AYRES
JACK L. MELCHOR
PERRY H. VARTANIAN, JR.
BY
J. Albert Hultquist
ATTORNEY INVENTORS
WESLEY P. AYRES
JACK L. MELCHOR
PERRY H. VARTANIAN, JR.
BY
J. Albert Hallquist
ATTORNEY

GYROMAGNETIC ISOLATOR-USING A NON-UNIFORM MAGNETIC BIAS

Filed March 1, 1956

INVENTORS
WESLEY P. AYRES
JACK L. MELCHOR
PERRY H. VARTANIAN, JR.
BY
J. Albert Hultquist
ATTORNEY

GYROMAGNETIC ISOLATOR-USING A NON-UNIFORM MAGNETIC BIAS

Filed March 1, 1956 5 Sheets-Sheet 4

INVENTORS
WESLEY P. AYRES
JACK L. MELCHOR
PERRY H. VARTANIAN, JR.
BY
J. Albert Hallquist
ATTORNEY

GYROMAGNETIC ISOLATOR-USING A NON-UNIFORM MAGNETIC BIAS

Filed March 1, 1956 5 Sheets-Sheet 5

INVENTORS
WESLEY P. AYRES
JACK L. MELCHOR
PERRY H. VARTANIAN, JR.
BY J. Albert Valtquist
ATTORNEY 3,095,546

GYROMAGNETIC ISOLATOR USING A NON-UNIFORM MAGNETIC BIAS

Wesley P. Ayres, Los Altos, Jack L. Melchor, Mountain View, and Perry H. Vartanian, Jr., Menlo Park, Calif., assignors, by mesne assignments, to Sylvania Electric Products Inc., Wilmington, Del., a corporation of Delaware Filed Mar. 1, 1956, Ser. No. 568,744
6 Claims. (Cl. 333—24.2)

Figure 1:
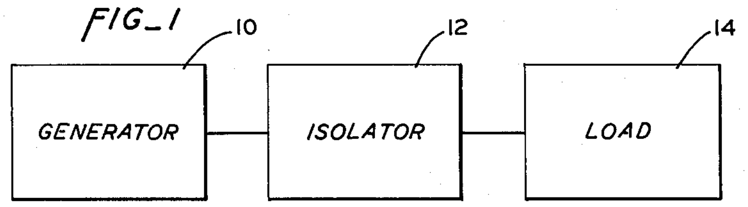

This invention pertains to an isolator adapted to attenuate microwave electromagnetic signals which travel in one direction without attenuating microwave signals which travel in the other direction in a waveguide, and more particularly to an attenuator utilizing a ferrite in the presence of a static magnetic field to achieve said attenuation. The term ferrite, as used in this description and in the claims, refers to any ferromagnetic material which exhibits the gyromagnetic effect at microwave frequencies.

Prior known attenuators or isolators which utilize ferrites have, compared to the device of this invention, relatively poor attenuation characteristics. That is, the value of the attenuation, measured in decibels, is relatively low and the ratio of the attenuation in one direction to the attenuation in the other direction is relatively low.

Prior known isolators which utilize ferrites provide a high attenuation over a narrow band of frequencies. The device of this invention, however, achieves a high degree of isolation over a broad band of frequencies.

For certain modes of excitation of a waveguide, for example, the $TE_{1,0}$ mode of excitation of a rectangular waveguide and the $TE_{1,1}$ mode of excitation of a circular waveguide, the phenomenon now to be described occurs.

Consider the situation in a rectangular waveguide operating in the $TE_{1,0}$ mode of excitation. The electric component of the electro-magnetic wave launched down the wave guide is a linearly polarized field which varies in amplitude but not in direction. The electric component of the electromagnetic wave is directed across the short dimension of the cross section of the rectangular waveguide. The magnetic component of the electromagnetic wave loops or curls around the lines of flux of the electric component in a plane normal to the electric component.

In order to achieve maximum isolation by means of ferromagnetic resonance phenomenon utilizing a ferrite, it is desirable that the magnetic component of the electromagnetic wave launched down the waveguide rotate in a circle within the ferrite. To achieve this result it is necessary that the magnetic component of the electromagnetic wave be elliptically rotating with a predetermined eccentricity of the ellipse. The meaning of ferromagnetic resonance phenomenon will be described presently. At any fixed point in the waveguide, the magnetic component of the electromagnetic wave moving down the waveguide relative to a fixed point causes the magnetic component of the electromagnetic wave observed at the fixed point to vary elliptically rather than circularly. That is, the rotating vector which represents the magnetic component of the electromagnetic wave at that particular fixed point not only rotates but also varies in intensity in such a way that the graphical representation of the motion of the vector representing the magnetic component at that fixed point would trace out an ellipse.

A ferrite interacts with an elliptically rotating magnetic field of a particular eccentricity to cause the magnetic component of the electromagnetic wave within the ferrite to rotate in a circle. For a given frequency of excitation of the waveguide, there is a unique position across the long dimension of the cross section of the rectangular waveguide where the magnetic component of the electromagnetic wave rotates in an ellipse with exactly the proper eccentricity to generate a circularly rotating magnetic field in a given ferrite. Thus, if a ferrite is placed in this unique position, good isolation characteristics are obtained. As the frequency of excitation of the waveguide changes, the position across the long dimension of the rectangular waveguide where the magnetic component of the electromagnetic wave rotates with just the proper elliptical eccentricity moves across the long cross sectional dimension of the rectangular waveguide.

A ferrite which is placed in an elliptical rotating field which does not have the proper eccentricity has its isolation characteristic decreased. Thus, although a ferrite could be made large enough so that there is always a portion of the ferrite in the region of proper eccentricity of the elliptically rotating magnetic component, there also would be a large portion of the ferrite which is in a region of improper eccentricity and the ratio of attenuation in the backward direction to attenuation in the forward direction of the isolator would be decreased. Hence, it is desirable to utilize a specimen of ferrite which is narrow in the direction of the long cross-sectional dimension of the rectangular waveguide in order to insure that the ferrite is in the region of proper eccentricity.

The device contemplated by this invention utilizes a means for concentrating the energy of the electromagnetic wave which passes through a waveguide into a particular region of the waveguide. A typical example of the concentrating means is a piece of dielectric material having a dielectric constant which is high relative to that of the surrounding medium. Another example is a ridged wave guide. By concentrating the energy of the electromagnetic wave into a particular region of the rectangular waveguide, the rotating magnetic component of the electromagnetic wave in a predetermined portion of that region is caused to have a substantially constant eccentricity of elliptical rotation. By suitably choosing the dimension of the dielectric material as a function of the dielectric constant of the material relative to the dielectric constant of the surrounding medium, elliptical rotation of the magnetic component of the electromagnetic wave, having the proper eccentricity to produce circular rotation of the magnetic component within a ferrite, is produced in a predetermined region adjacent the dielectric. A ferrite, thin in the direction of the long dimension of the cross section of the waveguide is placed in the region of proper eccentricity of the rotating magnetic component.

Thus, one of the requirements for achieving good isolation quality over an extremely broad band of frequencies is met by insertion of the dielectric material. The other requirement which must be met in order to have broad band characteristics is that the condition of ferromagnetic resonance in the ferrite must exist at all frequencies in the band. This second requirement is achieved by utilizing a non-uniform static magnetic field as described more particularly hereinafter.

The placing of the dielectric in the waveguide to concentrate the energy of the electromagnetic wave in a particular region of the waveguide not only produces a circularly rotating magnetic component of the electromagnetic wave within the ferrite, but also increases the ratio of the magnetic component to the electric component within that region. It is the reaction between the magnetic component of the electromagnetic wave and the ferrite which causes the isolation qualities of the isolator to exist. The increase in magnetic intensity of the magnetic component of electromagnetic waves, therefore, increases the attenuation of electromagnetic waves in a desired direction.

[redacted]

mal to the electric field, namely in the direction of the long cross-section dimension of waveguide 16 in the figures. For example, when a ferrite is utilized in the 8 to 12 kilomegacycle band, the thickness of ferrite 20 is preferably of the order of 0.010 inch. The length of ferrite 20 in the direction of travel of microwaves down waveguide 16 depends upon the amount of attenuation desired. The dimension of dielectric material 18 in the direction of travel of microwaves down waveguide 16 is sufficiently long to concentrate the rotating magnetic component of the electromagnetic wave into ferrite 20 throughout its entire length.

Figure 3:
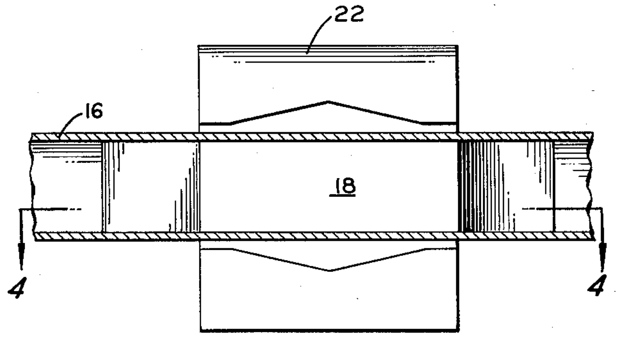
Figure 5:
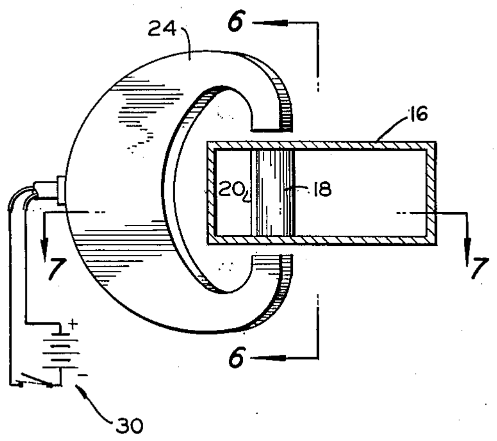
Figures 8, 9:
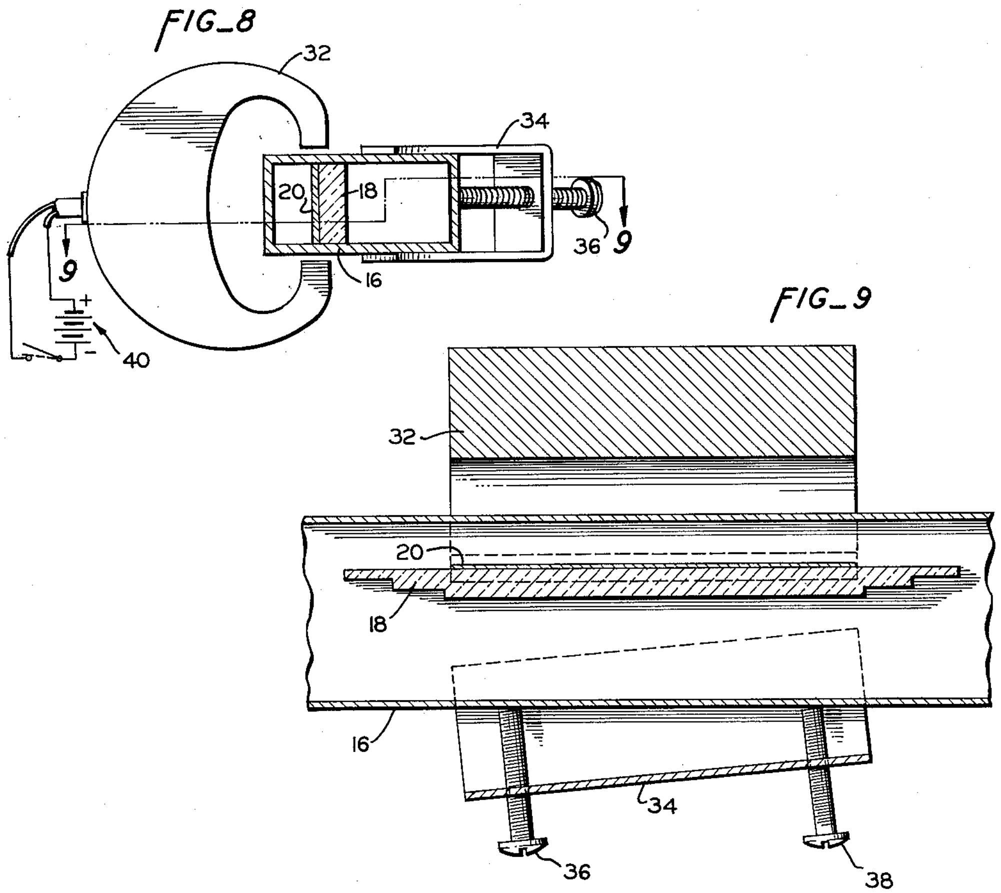
Figures 11, 12, 13:
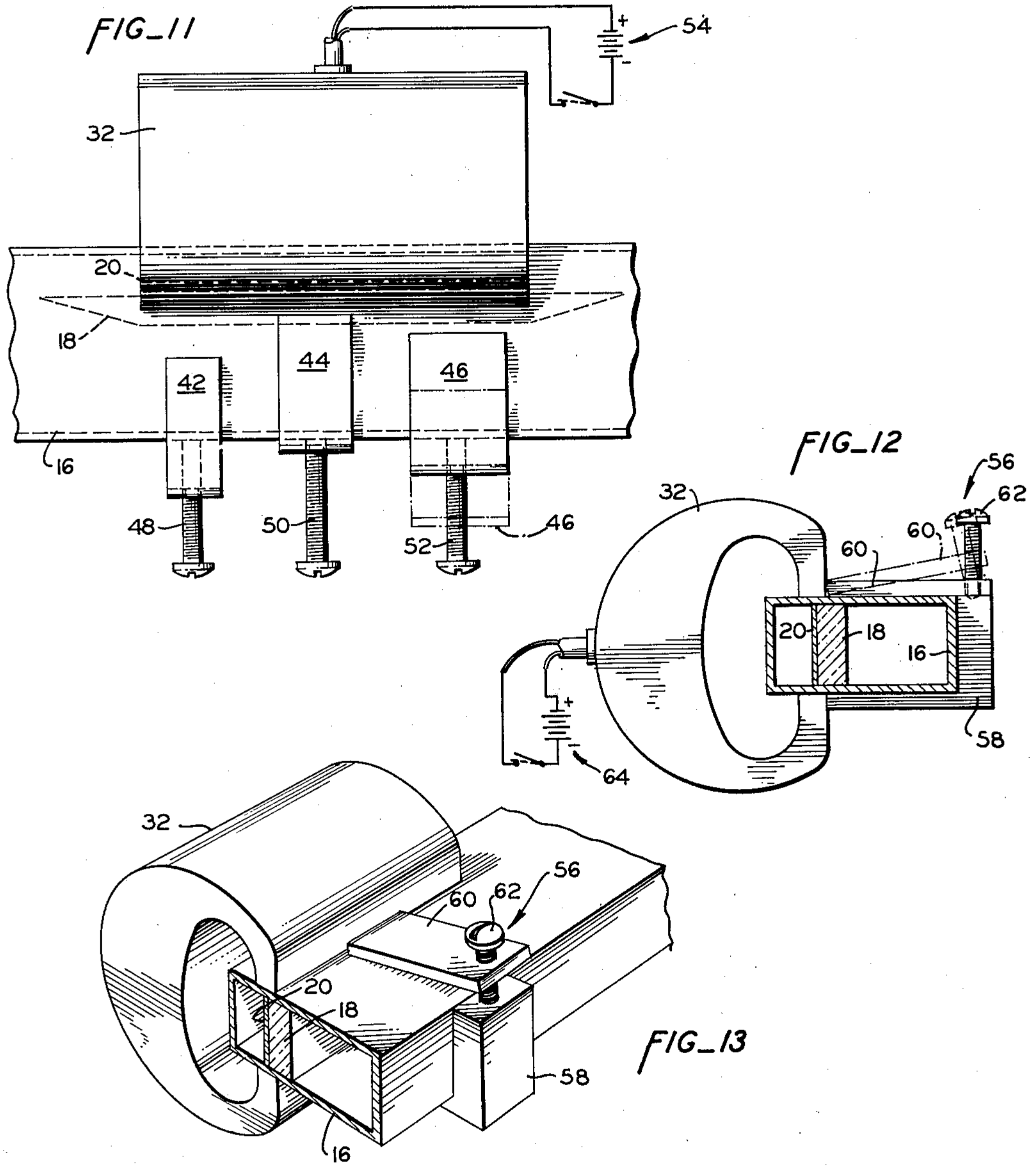

A static magnetic field is applied to magnetic ferrite 20 by means of electromagnet 22 and voltage source 28 connected as shown in FIGURE 3, electromagnet 24 and voltage source 30 connected as shown in FIGURE 5, electromagnet 32 and voltage source 40 connected as shown in FIGURE 8, electromagnet 32 and voltage source 54 connected as shown in FIGURE 11, and electromagnet 32 and voltage source 64 connected as shown in FIGURE 12. Alternatively, permanent magnet equivalents of these electromagnets may be utilized. Even though some of the figures are shown with the poles of the electromagnet in contact with waveguide 16 and some are shown with electromagnets not in contact with waveguide 16, in each case either embodiment may be utilized depending upon the intensity of magnetic field desired.

In order to achieve attenuation of microwave signals over a broad band, it is desirable to create a non-uniform static magnetic field within ferrite 20.

Figure 2:
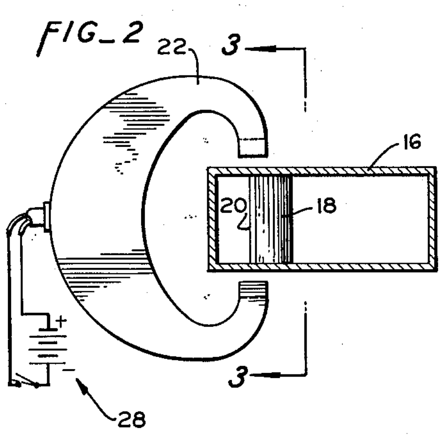
Figure 4:
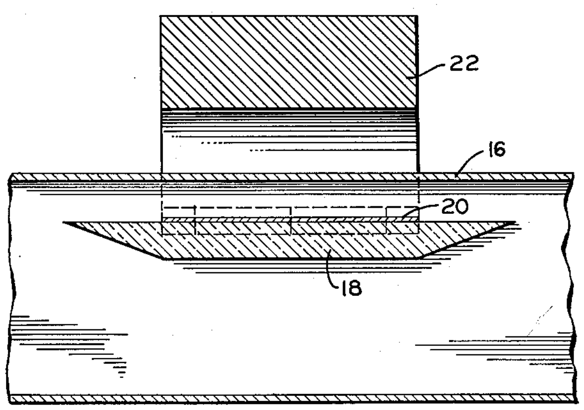

One means for creating a non-unform magnetic field within ferrite 20 is shown in FIGURES 2, 3 and 4. In FIGURES 2, 3 and 4, the faces of the poles of electromagnet 22 are tapered or shaped so that the intensity of the magnetic field varies along the length of ferrite 20. The shape of the pole faces need not be exactly as that shown in FIGURES 2, 3 and 4, particularly in FIGURE 3 but may be, for example, smoothly rounded or shaped to any predetermined function in order to achieve the attenuation versus frequency characteristics which are desired.

Figure 6:
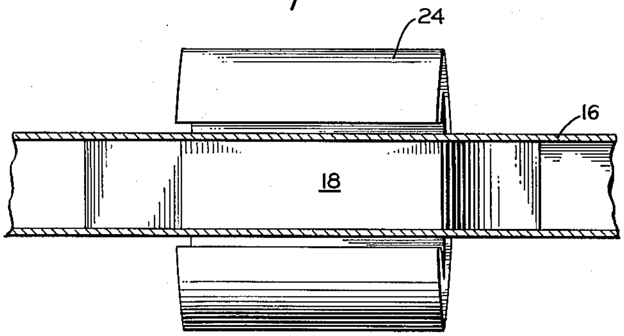
Figure 7:
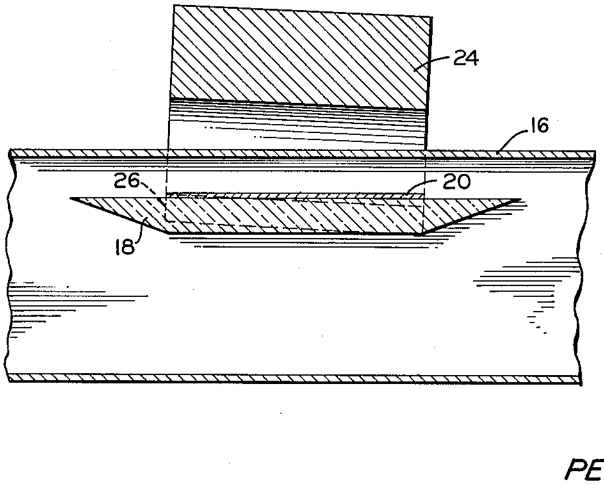

A second means for creating a non-uniform magnetic field in ferrite 20 is shown in FIGURES 5, 6 and 7. In FIGURES 5, 6 and 7, electromagnet 24 is shown turned at an angle relative to the plane of the sheet of the ferrite to generate a static magnetic field which is non-uniform and varies from point to point along the length of the ferrite.

A third embodiment of a means for generating a non-uniform magnetic field in ferrite 20 is shown in FIGURE 8. Electromagnet 32 is adapted to generate a magnetic field in the ferrite. The magnetic field generated by electromagnet 32 may or may not be uniform. A non-uniformity of a desired kind is created by shunting a portion of the static magnetic field generated by electromagnet 32 around the ferrite. A metallic shunt of preferably soft iron is adjusted upon waveguide 16 as shown in FIGURES 8 and 9, and may be selectively tilted relative to magnet 32 and the plane of the ferrite as shown in FIGURES 8 and 9. Screws 36 and 38 are adapted to make adjustment of shunt 34 to shunt a portion of the field 32 around the ferrite. The contour of shunt 34 need not be a straight line but may be of any predetermined contour in order to achieve the desired attenuation versus frequency characteristic of the ferrite. It is noted that in the embodiment of FIGURES 8 and 9 the shunt reaches along the entire length of the ferrite, and only one shunt is utilized.

Figure 10:
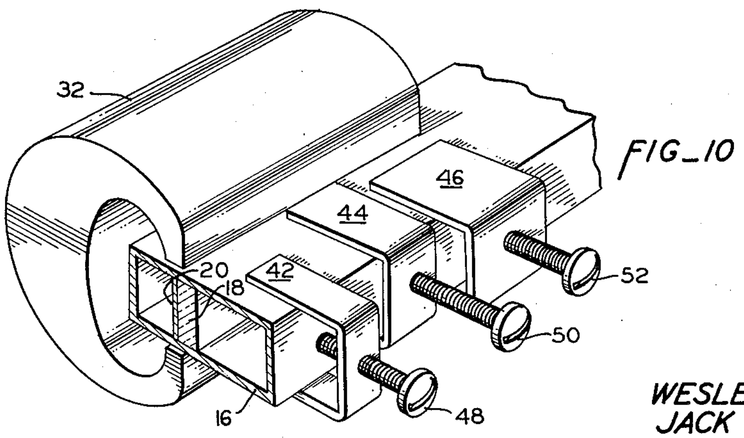

The fourth embodiment of the means for achieving a non-uniform magnetic field is shown in FIGURES 10 and 11. In FIGURES 10 and 11, electromagnet 32 generates a magnetic field in the ferrite 20. The field alternatively may, or may not be uniform. At least one, and perhaps more magnetic shunts such as shunts 42, 44, and 46 adjusted by means of screws 48, 50, and 52 respectively are placed over waveguide 16 adjacent to electromagnet 32 and the ferrite. It is to be noted that shunts 42, 44, and 46 are not necessarily of equal width. Shunts 42, 44, and 46 are adjustable in the long dimension of the cross section of waveguide 16 by means of screws 48, 50, and 52 respectively. By loosening screws 48, 50 and 52, shunts 42, 44, and 46 are slidable along the length of waveguide 16. Hence, shunts of any predetermined width and adjustment may be placed adjacent to magnet 32 and the ferrite to generate a static magnetic field of any predetermined non-uniformity desired to create a predetermined attenuation versus frequency characteristic.

A fifth embodiment of the means for varying the static magnetic field to generate a non-uniform static magnetic field is shown in FIGURES 12 and 13. In FIGURES 12 and 13, magnetic shunt 56 is positioned to deflect a portion of the magnetic field from magnet 32 around ferrite 20. Screw 62 is fabricated of non ferro-magnetic material, and is adapted to adjust the gap between member 58 and 60 to vary the portion of the magnetic field which is shunted around the ferrite. A plurality of shunts of the kind shown in FIGURES 12 and 13 may be distributed as shown in the embodiment of FIGURES 10 and 11 if desired.

In operation, electromagnetic signals are launched down waveguide 16 in one direction. For a given polarity of static magnetic field, the microwave electromagnetic wave passing in one direction, called the forward direction, for example from left to right in FIGURES 3, 4, 6, 7, 9, 10, 11, and 13, is attenuated very little and is effected only by the insertion loss of dielectric 18 and ferrite 20. However, energy which is launched down waveguide 16 in the other direction, called the backward direction, for example from right to left in the figures, is highly attenuated.

Figure 14:
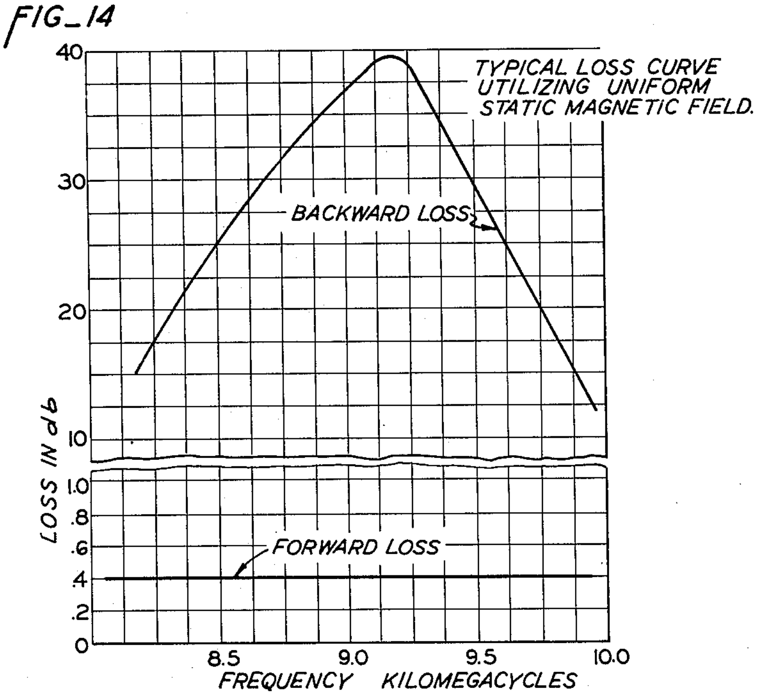

A typical loss curve for an isolator utilizing a substantially uniform static magnetic field in the ferrite is shown in FIGURE 14, wherein the attenuation is sufficiently high for most purposes over a reasonable band of frequencies. The frequency band is small relative to that achieved when a non-uniform static magnetic field is utilized. However, it is to be noted that the ratio of backward loss to forward loss when a substantially uniform static magnetic field is utilized is extremely high, reaching something on the order of a hundred to one at a frequency of approximately 9.3 kilomegacycles.

Figure 15:
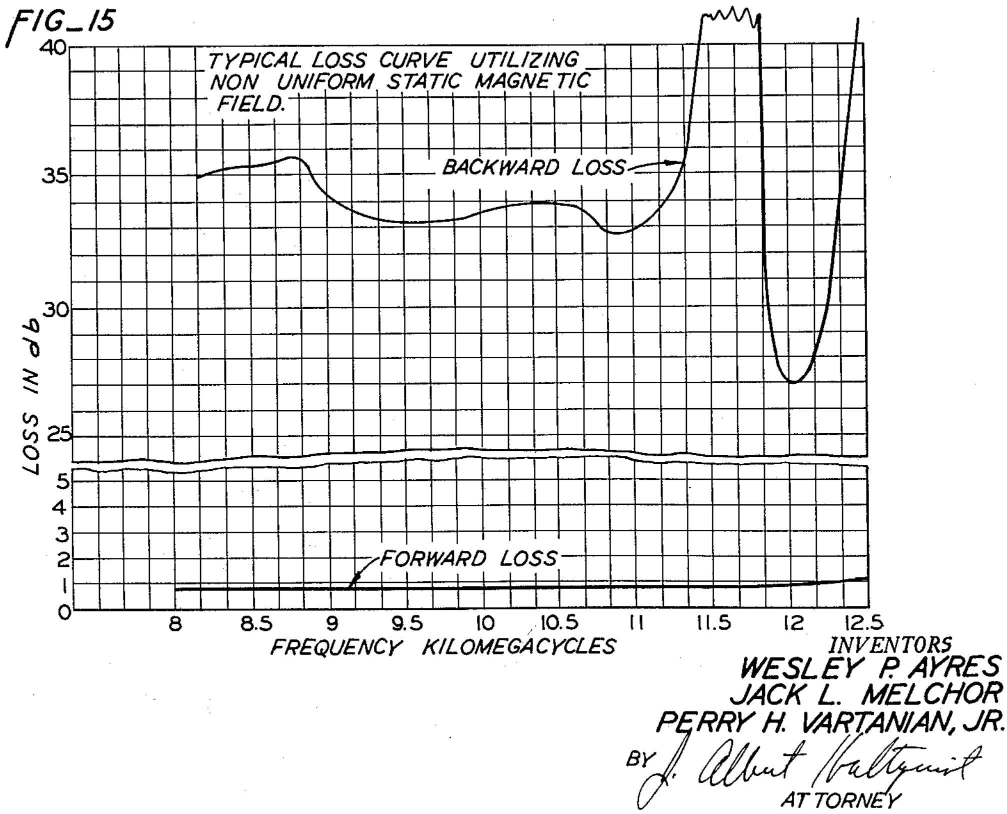

FIGURE 15 shows an actual plotted curve for a typical ferrite in the presence of a typical non-uniform static magnetic field. Where the curve runs off of the graph, the capability of the laboratory measuring equipment which was available was exceeded. It is to be noted that the backward loss of the device tested, and whose characteristics were plotted in FIGURE 15, has an attenuation that exceeds 27 decibels over a range from 8 to 12.5 kilomegacycles. It is to be noted further that the attenuation exceeds 32 decibels over a range from approximately 8.2 to 11.8 kilomegacycles. Thus, the isolator of the device of this invention has a high attenuation over an extremely broad band of frequencies.

By concentrating and increasing the intensity of the magnetic component of the electromagnetic wave into a narrow region of the waveguide, by introducing a ferrite specimen into said region, by causing said magnetic component to rotate in a circle within said ferrite, and by placing a non-uniform static magnetic field on said ferrite, a very high uni-directional attenuation of said electromagnetic waves is achieved.

Although the device of this invention has been described in particular detail in connection with the drawings, it is not intended that the invention should be